United States Patent
Sampathkumar (10) Patent No.: US 10,152,422 B1
(45) Date of Patent: Dec. 11, 2018

(54) PAGE-BASED METHOD FOR OPTIMIZING CACHE METADATA UPDATES

(71) Applicant: Seagate Technology LLC, Cupertino, CA (US)

(72) Inventor: Kishore Sampathkumar, Bangalore (IN)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/621,513

(22) Filed: Jun. 13, 2017

(51) Int. Cl.
*G06F 12/08* (2016.01)
*G06F 12/0882* (2016.01)
*G06F 12/0804* (2016.01)
*G06F 12/0866* (2016.01)
*G06F 12/02* (2006.01)

(52) U.S. Cl.
CPC ...... *G06F 12/0882* (2013.01); *G06F 12/0246* (2013.01); *G06F 12/0804* (2013.01); *G06F 12/0866* (2013.01)

(58) Field of Classification Search
None
See application file for complete search history.

(56) References Cited

U.S. PATENT DOCUMENTS

| | | |
|---|---|---|
| 7,962,686 B1 | 6/2011 | Tracht |
| 8,392,312 B2 | 3/2013 | Batsakis et al. |
| 8,458,331 B2 | 6/2013 | Chauhan et al. |
| 8,549,230 B1 * | 10/2013 | Chatterjee ............ G06F 3/0608 711/113 |
| 8,700,840 B2 | 4/2014 | Paley et al. |
| 8,874,680 B1 | 10/2014 | Das |
| 9,215,278 B2 | 12/2015 | Das |
| 9,323,663 B2 | 4/2016 | Karamecheti et al. |
| 9,451,027 B1 | 9/2016 | Kunkel et al. |
| 9,460,177 B1 | 10/2016 | Pawar et al. |
| 9,495,296 B2 | 11/2016 | Subramanyam et al. |
| 2009/0150605 A1 | 6/2009 | Flynn et al. |
| 2010/0172180 A1 | 7/2010 | Paley et al. |
| 2011/0289267 A1 | 11/2011 | Flynn et al. |
| 2014/0068183 A1 | 3/2014 | Joshi et al. |
| 2016/0080497 A1 | 3/2016 | Das |
| 2017/0139616 A1 * | 5/2017 | Dubeyko ............ G06F 3/0619 |

FOREIGN PATENT DOCUMENTS

WO 2015142344 A1 9/2015

* cited by examiner

*Primary Examiner* — Kevin Verbrugge
(74) *Attorney, Agent, or Firm* — Kagan Binder, PLLC (57) ABSTRACT

A method of adjusting asynchronous cache operations on a cache device includes accessing the cache device each cache window having a plurality of cache blocks, and each cache block having corresponding metadata indicating a status of the cache block. The method also includes receiving, at a first cache block, a first input/output operation and updating a first metadata of the first cache block, the first metadata being marked as dirty. The method also includes receiving, at a second cache block, a second input/output operation and updating a second metadata of the second cache block, the second metadata being marked as dirty. The method also includes grouping, in a page, the first and second input/output operations and updating, in a single operation according to the page, the first and second cache blocks according to the first and second input/output operations. The first and second metadata are then marked as non-dirty.

20 Claims, 6 Drawing Sheets

PAGE-BASED METHOD FOR OPTIMIZING CACHE METADATA UPDATES

BACKGROUND

The present disclosure relates to aspects of electronic storage, and relates in particular to improvements to the management of cache metadata operations related to one or more storage device.

In computing architecture, it can be beneficial to use one or more high-speed cache to temporarily store data that is commonly accessed, was recently accessed, or is probabilistically likely to be accessed in the future. A cache (or cache device) can exist as part of a storage hierarchy, and can be a software or hardware component. For example, data to be stored, or "cached," can use high-speed flash devices like solid-state devices (SSDs), among other devices and technologies suitable for caching. SSD-based caches may utilize flash memory, static random access memory (SRAM), and the like. Hierarchical caching structures are typically beneficial to the operation of digital computers at least in part due to the concept of "locality of reference," which asserts that the locality of a reference (e.g., one or more data blocks), either in terms of spatial or temporal locality, is an important factor that can limit or otherwise determine a computer's maximum or expected performance.

During a caching process, a cache typically stores a duplicate of a data block that is already stored on a primary, backend storage medium, also termed a "backing store" or "source." By nature, caches tend to be higher-speed than other associated storage devices, such as the backing store, but also tend to have a trade-off of a more limited storage capacity.

SUMMARY

In one aspect of the present disclosure, a method of adjusting asynchronous cache operations on a cache device includes accessing the cache device having a plurality of cache windows, each cache window having a plurality of cache blocks, and each cache block having corresponding metadata indicating a status of the cache block. The method also includes receiving, at a first cache block of the plurality of cache blocks, a first input/output operation. The method also includes updating a first metadata of the first cache block, in response to the receiving the first input/output operation, the first metadata being marked as dirty. The method also includes receiving, at a second cache block of the plurality of cache blocks, a second input/output operation. The method also includes updating a second metadata of the second cache block, in response to the receiving the second input/output operation, the second metadata being marked as dirty. The method also includes grouping, in a page, the first and second input/output operations. The method also includes updating, in a single operation according to the page, the first and second cache blocks according to the first and second input/output operations. The method also includes marking the first and second metadata as non-dirty.

A second aspect of the present disclosure is directed to a cache device. The cache device includes a plurality of cache windows, each cache window having a plurality of cache blocks, and each cache block having corresponding metadata indicating a status of the cache block. The cache device including a controller configured to perform various steps. One step to be performed by the controller includes receiving, at a first cache block of the plurality of cache blocks, a first input/output operation. Another step to be performed by the controller includes updating a first metadata of the first cache block, in response to the receiving the first input/output operation, the first metadata being marked as dirty. Another step to be performed by the controller includes receiving, at a second cache block of the plurality of cache blocks, a second input/output operation. Another step to be performed by the controller includes updating a second metadata of the second cache block, in response to the receiving the second input/output operation, the second metadata being marked as dirty. Another step to be performed by the controller includes grouping, in a page, the first and second input/output. Another step to be performed by the controller includes updating, in a single operation according to the page, the first and second cache blocks according to the first and second input/output operations. Another step to be performed by the controller includes marking the first and second metadata as non-dirty.

A third aspect of the present disclosure is directed to another method of adjusting asynchronous cache operations on a cache device. The method includes accessing the cache device having a plurality of cache windows, each cache window having a plurality of cache blocks, and each cache block having corresponding metadata indicating a status of the cache block. The method also includes receiving, at a first cache block of the plurality of cache blocks, a first input/output operation. The method also includes updating a first metadata of the first cache block, in response to the receiving the first input/output operation, the first metadata being marked as presently existing only in the cache device. The method also includes receiving, at a second cache block of the plurality of cache blocks, a second input/output operation. The method also includes updating a second metadata of the second cache block, in response to the receiving the second input/output operation, the second metadata being marked as presently existing only in the cache device. The method also includes grouping, in a page, the first and second input/output operations. The method also includes updating, in a single operation according to the page, the first and second cache blocks according to the first and second input/output operations. The method also includes removing the marking of presently existing only in the cache device from the first and second metadata.

These and various other features and advantages will be apparent from a reading of the following detailed description.

BRIEF DESCRIPTION OF THE DRAWINGS

Other important objects and advantages of the present invention will be apparent from the following detailed description of the invention taken in connection with the accompanying drawings.

DETAILED DESCRIPTION

As a general overview, embodiments of this invention introduce caching schemes by which cache metadata updates related to individual cache blocks on a cache device can be selectively queued and grouped in data volumes called pages, followed by transmitting a queued group of updates together at once as a single page. In order to perform various embodiments, one or more metadata page tracking structures (MPTSs) can be introduced in order to track and manage cache blocks and/or cache windows using cache metadata, including various "flags," which can be used in an MPTS to identify, classify, track, and/or manage aspects of example cache structures and associated cache operations. It is contemplated that embodiments described herein may each be implemented using various MPTS (and the like) configurations and schemes even where not explicitly mentioned.

Presently, for every user cache write request and other cache operation, a separate persistent cache metadata input/output (I/O) update operation is issued. In particular, this is often the case for operations that require such cache metadata updates. In a cache, the concept of a flushing operation or simply "flush" is when a cache is caused to update at least one cache block of information to a backing store. A flush can include reading data from the cache device, writing it out to a backing store, followed by marking these cache blocks as "clean" in the persistent cache metadata. After a flush, the affected cache blocks are then ready and available to be reused and overwritten, for example in a cache miss scenario, among other circumstances. Cache status (e.g., dirty/clean, valid/invalid, etc.) data can be stored in cache metadata, which can be stored within the cache itself. Existing methods generally compulsorily update the persistent (backing store-based) cache metadata for every flush metadata I/O operation, sometimes sending updates between cache and backing store that include a substantial number of data blocks that contain no useful information.

For a point of reference, an idealized cache would duplicate its cached data to a backing store instantly upon being written or modified. However, due to limitations in known computing architecture, and for at least the reasons described above, it can be inefficient to immediately update a cache's backing store at every potential opportunity. A cache block that has been changed on the cache but not yet "mirrored" to the associated backing store is called a "dirty" cache block. Stated differently, a dirty cache block (e.g., of a cache device) is a cache block containing data that presently exists only in the cache. The data is desired to be transmitted, but has not yet been transmitted to the more stable, larger, and slower, backing store. For an I/O write request that causes a clean cache block to become dirty, after completion of data write to cache device, an in-memory stored copy of a dirty metadata bitmap (e.g., a type of data grid) is updated following which the cache metadata containing a dirty cache metadata bitmap is also updated to the cache device.

For at least the reasons outlined above, a dirty cache block often contains data that may be considered "at risk" in the sense that it is not presently stored in a device configured for long-term backend storage, such as by using a hard-disk drive (HDD). As outlined above, a flush operation includes reading data from a data volume (e.g., a cache block) of a cache device, followed by writing the read data to a corresponding backing store. Once written to the backing store, the cache blocks are marked as clean in the corresponding cache metadata, which may be persistent cache metadata. Together or separately, aspects of the existing methods and systems can result in large and undesirable overhead in terms of the operations issued to the cache devices, including both number of operations and type of operations. The operations can include modification or I/O operations to cache metadata.

In addition, existing methods and systems often cause the described frequent and repeated updates to cache metadata area on cache devices, including solid-state drives (SSDs). These updates when in large numbers can adversely affect the usable lifespan of SSD-based cache devices. The methods and systems disclosed propose solutions that address these and other cache device shortcomings. Further, SSD endurance and cache I/O performance can be improved by eliminating (through grouping and delay) the update of persistent cache metadata as part of every flush I/O operation and by eliminating the need to issue separate I/O operations to update persistent cache metadata for every user I/O write request requesting such updates.

Disclosed are processes for grouping multiple update requests on a given metadata page. MPTS examples can optimize persistent metadata updates issued by user I/O write requests. Examples MPTSs can include grouping together multiple update requests that are otherwise individually and separately issued on the same metadata page. In place of a piecemeal approach, a single update would instead be issued on their behalf, as per the methods and systems described herein.

According to embodiments of the present invention, grouped cache metadata updates may be transmitted (e.g., using an MPTS) in response to a triggering event such as a user-initiated cache update (e.g., a cache write) or a threshold-based cache flush operation. Upon the triggering event, a cache backing store (e.g., backend disk or source) can then be updated according to multiple cache metadata updates which can be appended to the user-initiated cache update in a single, discrete page of data. Various embodiments describe user-triggered operations, and other described automatically-triggered operations as determined by a computing device. As used herein, a user may be a human user, such as an administrator or other technician. The user may take other forms, such as a computer program, application, or various embodiments of artificial intelligence, as used herein.

Figure 1:
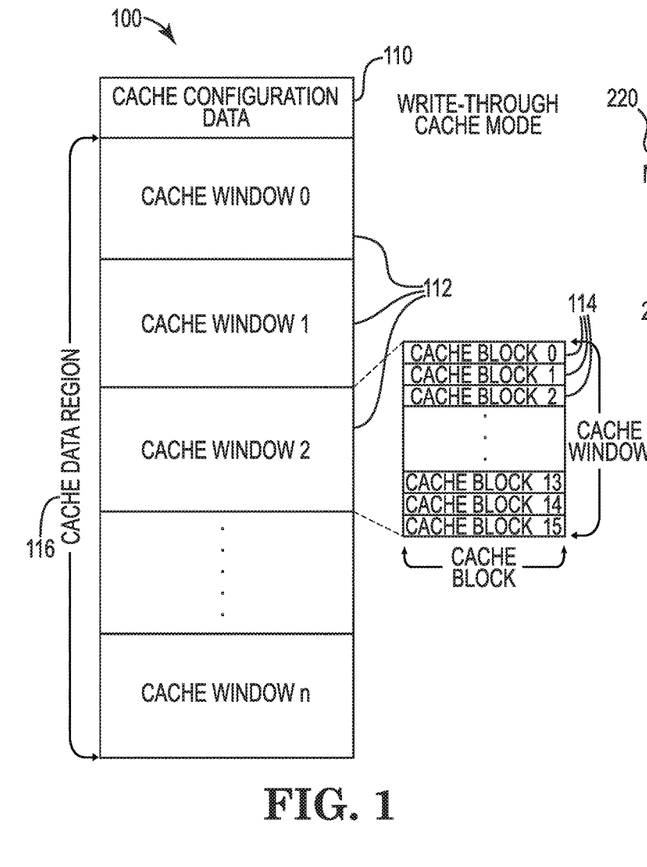
FIG. 1 illustrates cache components used during a write-through cache mode, according to various embodiments.

FIG. 1 illustrates cache components 100 used during a write-through cache mode, according to various embodiments.

In order to perform cache operations, various cache aspects and structures can be utilized. As shown, an example cache 100 (e.g., a cache device) can be divided into cache windows 112, which are basic computer readable and writable units used in cache allocation and management. The limited usable storage space of cache data region 116 of a cache 100 is typically divided into a multiple of the cache windows 112, which can be equally-sized. Each cache window 112 can include a device number for the mapped volume (which may also be termed a volume ID) and a window number for the mapped volume (i.e., a volume window number) corresponding to the data volume that is cached in this cache window 112. A data volume, as used herein, can be any medium in which data is stored (either physically or virtually) in a file or in a database, and each data volume may include metadata including the amount of related data to be stored. Various storage media contemplated include caches, cache windows, cache devices, and other media. Data volumes are also referred to as a virtual disks or virtual devices, and are indicated as VDs, herein. Corresponding to data stored in VDs, allocation and management of cache data can be done in units of cache windows 112.

Each cache window 112 may in turn be sub-divided into a fixed number of equally-sized cache blocks 114 (also termed cache-lines). A cache block 114 is the basic unit of performing input/output (I/O) on a cache 100. Within each cache window 112, data validity is typically tracked in terms of cache blocks 114. Both the cache window 112 size and cache block 114 size are configurable and thus can vary. Cache window 112 sizes typically range from 64 kibibytes (KiB) to 1 mebibyte (MiB) (1024 KiB) and the corresponding sizes for cache blocks 114 may range from 4 KiB to 64 KiB, for example with 16 cache blocks 114 per cache window 112. Cache 100 can include cache configuration data 110, which may be stored within cache 100, but separate from cache data region 116.

Caches can employ various modes of writing data to be cached to an associated backing store. These modes are known as "cache modes" or "write policies." Examples of write policies include write-through (WT) and write-back (WB). Very broadly, using a WT write policy includes writing to both the cache 100 and the backing store synchronously, i.e., at substantially the same time. In contrast, a WB write policy involves an initial write to a cache 200 only, shown in FIG. 2, followed by a marking corresponding metadata as dirty if not already so-marked. The corresponding write to the associated backing store (not shown) would occur later, if at all. These write policies are described in greater detail, below. As a result of synchronized writes in WT, cache data is typically non-persistent. For example, upon a possible system crash, the cache 100 would become invalid, but no recovery would be needed as the cached data should already have been written to the appropriate backing store. Similarly, upon a system reboot the cache 100 used for WT would become invalid. Note that these polices are limited to writing only, and do not typically apply to reading data. Generally speaking, a WT policy may be well-suited to a cache configured to be primarily read, and a WB policy may be well-suited to a cache configured for reading and/or writing. As described, herein, one or more metadata page tracking structure (MPTS) can be employed to perform various described operations, as necessary.

Figure 2:
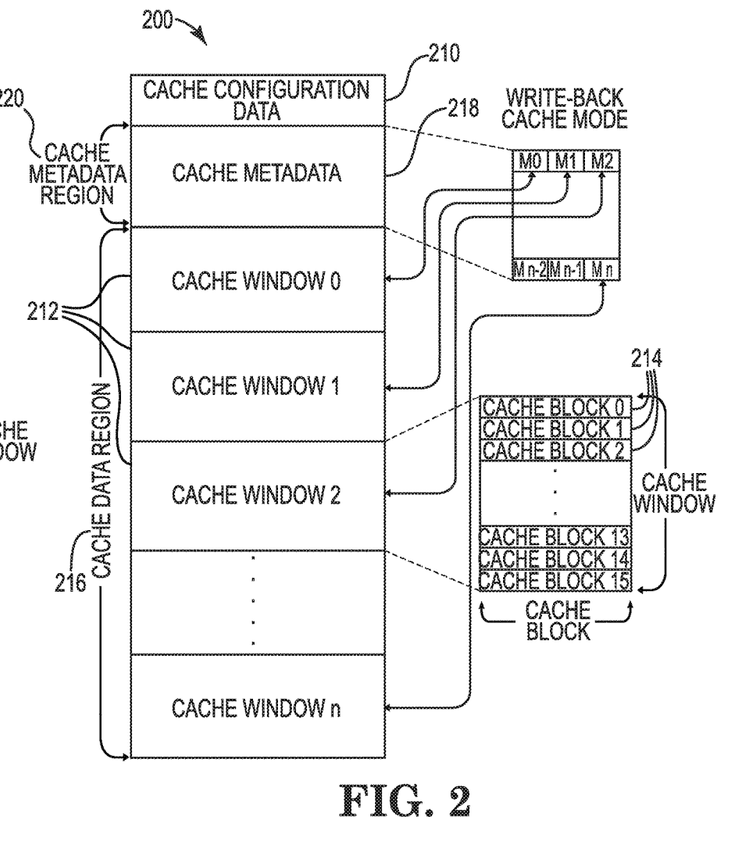
FIG. 2 illustrates cache components used during a write-back cache mode, according to various embodiments.

FIG. 2 illustrates cache components 200 used during a write-back cache mode, according to various embodiments.

Shown is an embodiment of a cache 200 configured to utilize a write-back (WB) writing policy. When compared to WT, WB is generally more flexible and configurable, but also typically more complex than WT. The relative complexities of WB and WT can be seen by comparing FIG. 2 to FIG. 1. Cache 200 has many of the same features as cache 100 (FIG. 1), including cache configuration data 210, cache windows 212, cache blocks 214 within each cache window 212, and a cache data region 216. But cache 200 also introduces additional features, including cache metadata 218, discussed further, below, which can be located or stored in an allocated cache metadata region 220 of cache 200.

Cache metadata 218 (also simply referred as metadata) is shown in some detail, and may include information ($M_0$, $M_1$, $M_2$, etc.) relating to each cache window 212 (shown as $M_{n-2}$, $M_{n-1}$, $M_n$, etc.) corresponding to each cache window 0 through n 212, respectively. Note that cache metadata 218 along with cache blocks 214 and cache windows 212 may take up a greater percentage of cache 200 per total cache block 214 than in WT-configured cache 100 because cache metadata region 220 may not typically be necessary in cache 100. Although cache metadata region is depicted as comparable in size for each cache window 212, various relative sizes of cache metadata region 220 and cache windows 212 are contemplated, and the various features may not be necessarily drawn to scale.

Metadata 218, as shown, can include a cache metadata bitmap (see metadata bitmap 316 of FIG. 3) that includes data pertaining to one or more cache blocks 214s being, for example, valid and/or dirty (see FIG. 3) allocated from the cache device. Valid/invalid and dirty/clean data may be binary data, according to various embodiments. The cache metadata 218 can also include other information, such as mapping details, including the mapping VD and the region/blocks on the VD whose data is cached in the corresponding cache blocks 214 (see cache block information metadata 324 of FIG. 3 for greater detail). The cache metadata region 220 of a cache device may be persistent and may survive various computer system and hardware power cycles and/or system reboots. Cache metadata 218 can include various other components and data as outlined herein, including MPTS elements and/or various flags.

Cache metadata 218 can itself be stored persistently on the corresponding cache 200. The metadata 218 may be stored in random access memory (RAM) or other high-speed memory for faster access. Persistent storage of metadata 218 in cache 200 typically becomes important in situations where the cache 200 loses power, or an associated computer is otherwise power cycled, so as to not lose data in the process. Cache 200 can have a large capacity cache memory, where the cache window and cache block size are configured to be relatively large at least in part to reduce the size requirements of metadata 218 on the cache 200 and RAM. In general, more cache blocks 214 may correlate to more cache block metadata 218 entries. For example, in one embodiment, a cache window 212 size is 1 MiB, each with 16 cache blocks, 214 where cache block 214 size is therefore 64 KiB, with size of both valid and dirty cache metadata bitmap per cache window of two bytes each (for a total four bytes), with one bit in each of the two bytes representing the state of each cache-line within a cache window. Fewer total cache blocks 214 may therefore lead to less storage used for metadata 218 (and therefore a small cache metadata region 220) instead of task-oriented, useful data storage (e.g., cache data region 216) on the cache.

Embodiments include methods that can update cache metadata 218 on the example cache 200. In one embodiment, though cache metadata 218 for each cache window 212 is a few bytes (8-16 bytes), a write issued to update metadata 218 on cache 200 is page-sized, where 8 KiB is a typical value for the size of a data volume page in current SSD technology. The page size can be determined by minimum page size, or "atomicity" guarantees provided by the characteristics of the underlying cache 200. A page-size aligned write may be fully written onto the SSD-based cache 200 upon success, whereas nothing may be written in the case of a write failure.

Excessive page size (e.g., a function of atomicity) based on the amount of data to be transferred in the page may lead to wasted digital storage during existing data transfers, often sending blank data blocks along with used, content-filled data blocks. Making productive use of these otherwise blank or empty data blocks can form one advantage of the described invention. It may be noted that on an example hard-disk drive (HDD), the atomicity guarantee (e.g., setting) provided is at a sector level: e.g., 512 bytes of data. With typical SSDs, 8 KiB may be a typical minimal atomicity guarantee and may be used as an example value for the purpose of various embodiments. Some atomicity guarantees can be preferable for various embodiments, but embodiments may not be constrained or based on any specific value for the size of atomicity. Cache writes using a full (or relatively fuller) page size may also improve alignment and size for efficient I/O handling by cache 200.

According to various embodiments, the number of cache windows 212 covered by a page-size write of cache metadata 218 (e.g., 8 KiB) typically depends on the size of each metadata 218 entry on the cache 200. As an example, if the size of each metadata 218 entry is 16 bytes, then, every 8 KiB page write would cover 512 metadata 218 entries and thereby 512 cache windows. Since the size of cache windows 218 are configurable, with typical ranges being from 64 KiB to 1 MiB, every 8 KiB page-size cache metadata 218 update can correspondingly cover an aggregated range of 32 MiB to 512 MiB of cache data in cache data region 216 on the cache 200.

As another example, if the size of each metadata 218 entry is 8 bytes, then, every 8 KiB page write would cover 1024 metadata 218 entries and thereby 1024 cache windows. Since the size of cache windows 212 are configurable, with typical ranges being from 64 KiB to 1 MiB, every 8 KiB Page-size cache metadata 218 update can correspondingly cover an aggregated range of 64 MiB to 1 GiB (1024 MiB) of cache data on the cache 200, according to some embodiments.

As outlined, some notable differences typically exist between the WT and WB writing policies. In particular, WB schemes generally utilizes asynchronous cache writes that include temporal sensitivity and that are situation-flexible. In contrast to the synchronous cache writes in WT, asynchronous cache writes typically involve an immediate write operation to the cache 200, but a delayed (or sometimes non-existent) write operation to the backing store. In WB, the cache writes can also be triggered by various events or circumstances, such as an indication that a particular cache block 214 is about to be modified or overwritten with new content, or otherwise is directed to update the cache 200.

Also in contrast to WT policies, persistent metadata 218 in WB can be maintained in the allocated cache metadata region 220 of cache 200. For example, upon a system crash or temporary shut-down, the cache blocks 214 potentially affected by the crash may still technically be valid, but would become "dirty" as well as valid. A dirty cache block 214 can be tagged using metadata 218 and corresponding backing store blocks can be targeted and set to be overwritten, but the data on the corresponding backing store is not yet actually overwritten. A clean cache block 214, in contrast to a dirty cache block 214, is one that has corresponding backing store blocks not yet been overwritten (and has clean cache blocks 214 so marked through metadata 218), and which therefore can contain usable data that can be read. In contrast to dirty cache blocks 214, so-called "invalid" cache blocks 214 contain old, obsolete data that eventually will be refreshed and updated from the associated backing store. For example, some first data can be written to cache blocks 214 of a cache device, and next the data in the cache blocks 214 can be marked as dirty in the corresponding metadata 218 if not already so marked. The dirty cache blocks 214 would then become clean when a flush process writes the dirty cache blocks to the corresponding backing store.

As discussed, cache metadata 218 can be maintained to keep track of the status of all the cache windows 212 and whether a particular cache block (e.g., cache block 214) in each of the cache windows is resident in cache memory of the cache 200. Possible cache block 214 states may include valid and invalid. The cache block 214 may also be classified, identified, and/or flagged as dirty or non-dirty (i.e., clean), as discussed further, herein.

By selectively appending cache metadata updates involved in a flush I/O operation to regular user I/O requests that issue cache metadata updates "dirtying" the cache blocks, separate metadata updates for flush I/O operations can be reduced or even eliminated. The need to issue separate I/O operations to update persistent cache metadata for every user I/O write request requiring such updates can be reduced by grouping such updates in pages. By optimizing cache metadata updates on a cache device during, for example, a cache flush operation in WB caching mode, the need to issue such updates separately or individually can be reduced, or even eliminated, for user I/O write requests requesting such updates.

In an asynchronous cache mode, such as a WB cache mode, for every I/O write request issued by the user on one or more clean cache blocks (thereby making the corresponding cache blocks dirty), upon successful completion of the write request to the cache device, the in-memory metadata for the cache blocks may be updated by setting the corresponding bits in a dirty cache metadata bitmap. This dirty cache metadata bitmap would then be made persistent by sending a metadata update request to the cache device. Completion of the user I/O may be delayed until the metadata on the cache device is updated.

In addition to the descriptions and limitations of caches, above, a common existing practical shortcoming of caches (e.g., cache 200) includes a limited useful lifespan. For every time the cache 200 sub-system is restarted, or the host system on which this runs is rebooted and/or power cycled, the cache 200 is typically rebuilt in WT cache mode. This is because the cache 200 is non-persistent in WT cache mode. Every time the system associated with the cache 200 is restarted, or the host system is rebooted or power cycled, the system generally starts from an initialization step. In WB cache mode, there may typically be no need for the initialization step since a WB cache is generally persistent.

Figure 3:
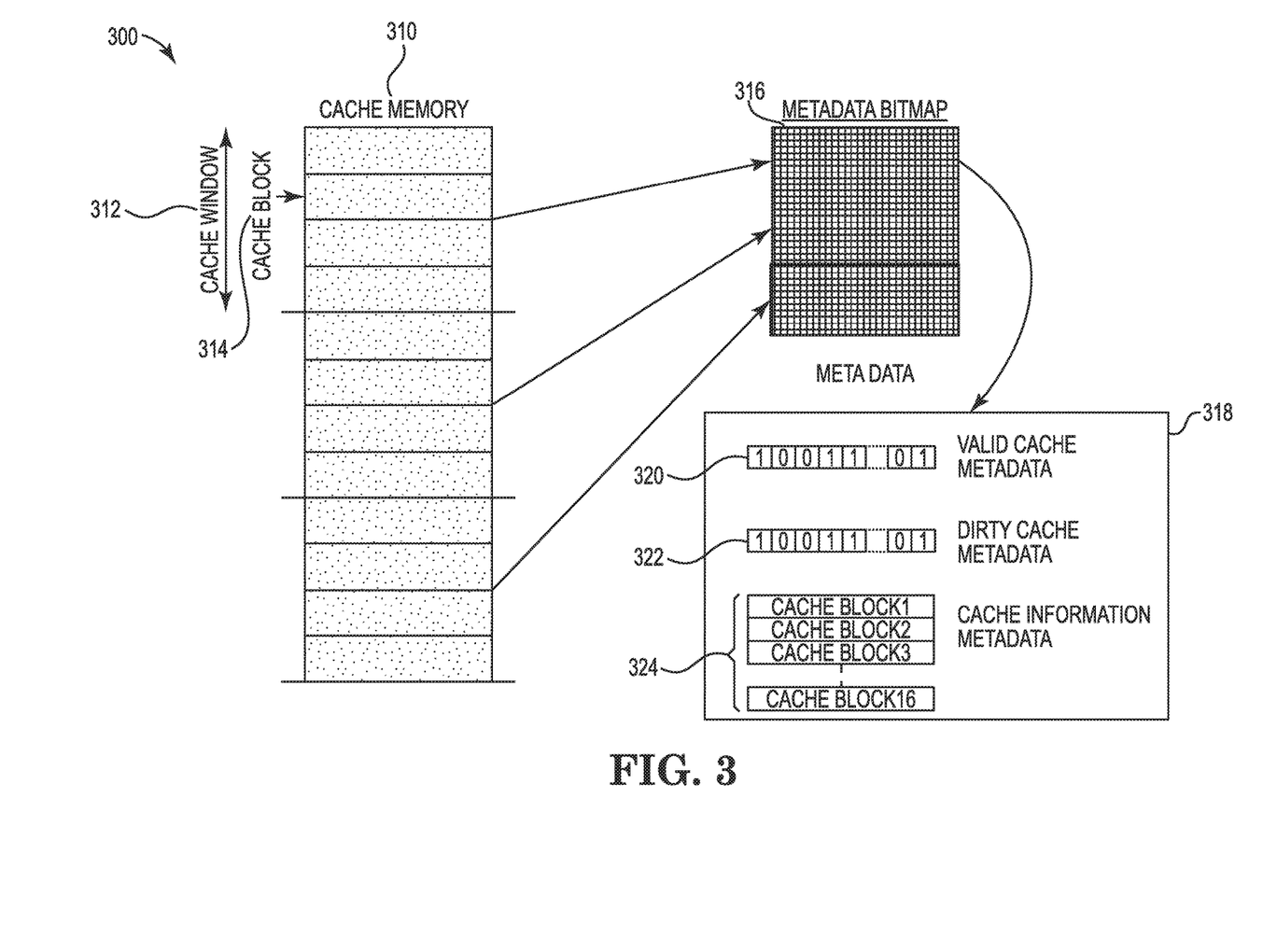
FIG. 3 is a diagram of a cache window and corresponding cache metadata bitmap 316, according to various embodiments.

FIG. 3 is a diagram 300 of a cache window and corresponding cache metadata bitmap 316, according to various embodiments.

A storage device (or VD) can be configured to store metadata for each cache block 314, and the metadata may be stored and structured as a cache metadata bitmap 316. Cache metadata bitmap 316 can include dirty/clean cache metadata (e.g., stored as a dirty cache metadata bitmap) and valid/invalid cache metadata bitmap (e.g., stored as a valid cache metadata bitmap), and can include a computer-readable grid of individual cache metadata that is maintained and updated every time a dirty/clean or valid/invalid status changes for cache block 314. A selection of example cache metadata data contained in the cache metadata bitmap 316 is illustrated as metadata 318. Metadata 318 can include valid cache metadata 320 (e.g., as a data bitmap or data row/column), dirty cache metadata 322 (e.g., as a data bitmap or data row/column), and cache block information 324. Metadata 318 may include reading data from the dirty cache metadata bitmap and/or the valid cache metadata bitmap. Valid cache metadata 320 may include two bytes of valid/invalid data with one bit (e.g., a computer-readable "1" or a "0") assigned to a cache block 314. Dirty cache metadata of metadata 318 may include two bytes of dirty/clean data with one bit assigned to a cache block. As shown, cache block information metadata 324 include information relating to 16 cache blocks 314.

As outlined earlier, cache block information metadata 324 can be included in cache metadata 318 for each corresponding cache window 312. Cache block information can contain metadata 318 for each cache block 314 within the cache window 312 and can also contain other corresponding to the volume that is cached in this cache window 312. Cache block information metadata 324 can include a total of about four bytes per cache window, and may store other cache block metadata, not covered by valid cache metadata 320 or the cache block information metadata 324. Cache block information metadata 324 stored in the cache metadata 318 may include a mapped device number (also termed "Volume ID"), typically one or two bytes, and a mapped block number (also termed "Volume LBA"), typically two to four bytes. The cache I/O operations (e.g., write operations) issued by a user or application may not be acknowledged of completion until the cache metadata 318 is successfully updated on the applicable cache device.

With regard to mechanisms for keeping cache metadata 318 up-to-date, cache metadata 318 can be synchronized using an in-memory metadata buffer (not shown). For example, cache metadata 318 may be synchronized with the in-memory metadata buffer by updating the buffer whenever the in-memory cache metadata bitmap 316 is modified. Therefore, the cache metadata bitmap 316 can be updated during cache I/O operations, but the cache I/O operations may not immediately be validated (transferred and stored to the backing store), for at least the reasons described herein.

With respect to the dirty cache metadata 322, the cache blocks of a cache (or cache window 312) may remain dirty up to a configurable threshold so that there are sufficient cache "hits" (also termed a "cache hit ratio"), particularly for read requests, on the cached data already marked dirty due to prior writes. Beyond this threshold, a trigger based on dirty cache metadata 322 may cause the dirty data to be grouped (e.g., in a page) and flushed to the backing store, clearing more usable clean cache space. See also FIGS. 5 and 8 and accompanying description of flush-based cache I/O operations (e.g., write requests) for greater detail.

If persistent cache metadata updates are not issued as part of flush write I/O operations, in extreme cases it is possible that the persistent dirty cache metadata 322 would have most of the bits set whereas the in-memory dirty cache metadata bitmap has the corresponding metadata bits clear. In such a scenario, a system crash and/or system restart may result in unnecessary re-flush of many of the dirty data blocks since the percentage of such dirty data blocks may be relatively high. Such a re-flush may be based on a "safe" upper thresholds for the percentage of dirty data blocks that the caching system may enforce. To handle this particular case, a low priority cleaner thread can be implemented, which can monitor such an extreme case, and trigger a slow update of in-memory copy of the corresponding metadata pages to the persistent copy residing on the cache device. This step may occur relatively infrequently since the large number of user I/O write requests may trigger a persistent update of the metadata pages containing dirty cache metadata bitmap on which the metadata updates as part of flush write I/O operations are appended.

Example implementation embodiments may handle I/O errors during an update to cache metadata 318 by failing the corresponding user I/O requests waiting for signaling of I/O completion. However, I/O errors on any updates to a cache device in WB caching mode can at times negatively affect cache performance. The cache device may become a vulnerable single point of failure of the cached data that is not yet committed to the backing store of the cache. However, this problem may be addressed in part in some cases by incorporating known data redundancy techniques into the cache device using, for example, RAID1 (mirroring), or other schemes such as RAID5/RAID10. As an example, on Linux, MDRAID software can be used to create a RAID1 MDRAID volume, which would then be configured as a cache device.

Figure 4:
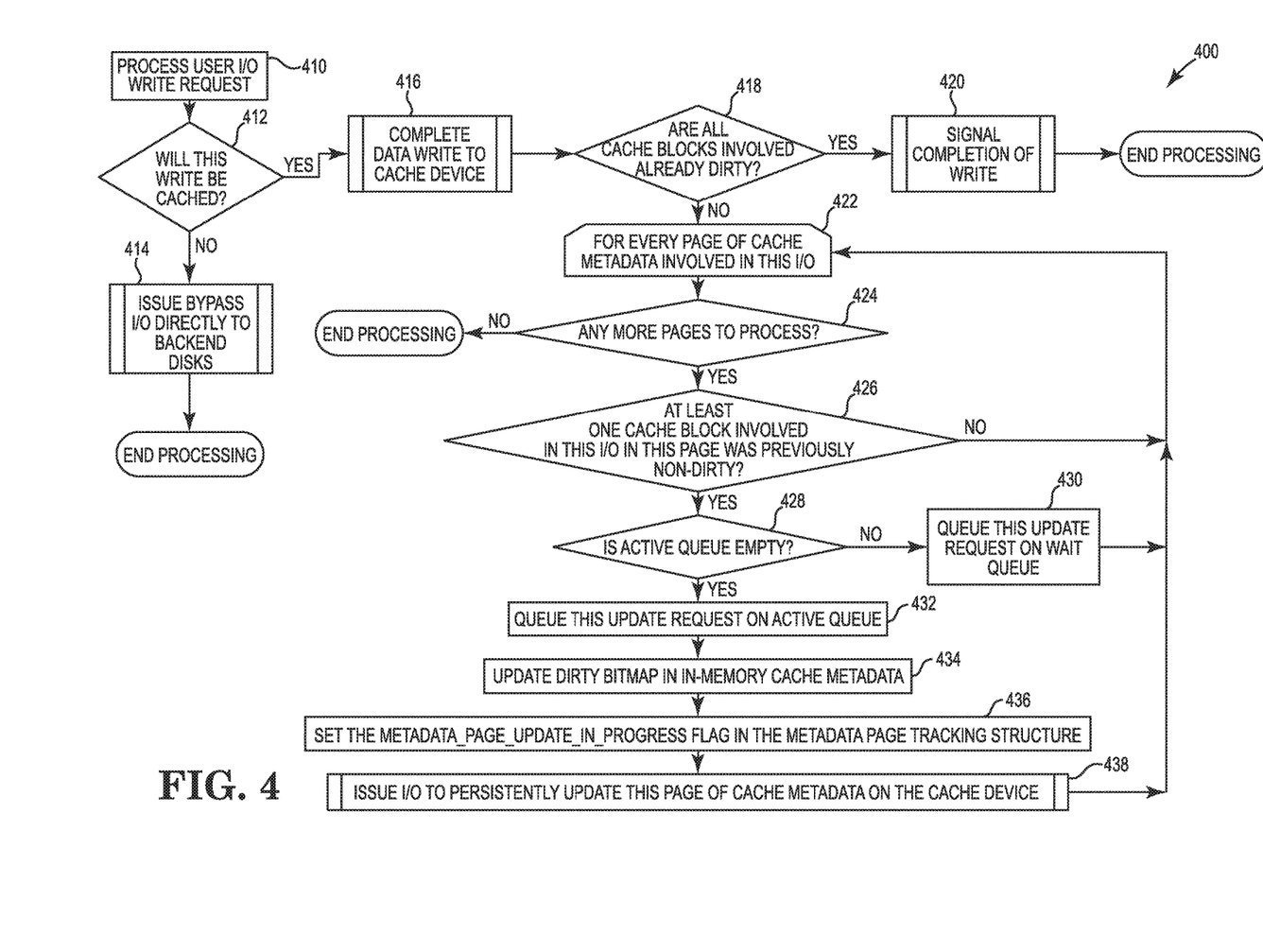
FIG. 4 a flowchart representing a process for processing a user I/O write request, while taking into consideration the grouping of multiple update requests on a given page of cache metadata, according to various embodiments.

FIG. 4 a flowchart representing a process 400 for processing a user I/O write request, while taking into consideration the grouping of multiple update requests on a given page of cache metadata, according to various embodiments.

A process 400 (e.g., implemented using an MPTS) may receive a user I/O write request at operation 410. In one embodiment, the user I/O write request 410 dirties a previously clean cache block. Processing steps for an I/O write request can determine whether the write request will be cached at operation 412. If it is determined that the write request will be cached, the process 400 may continue by completing data write to a cache device at operation 416. A page of cache metadata can be updated to a cache device immediately after completion of the data write to the cache device. Alternatively, at operation 412, if it is determined that the write request is not to be cached at operation 412, the write request can be issued directly to backend disk(s) (backing store) at 414, and the process may end. Following completion of the data write to the cache device at operation 416, it may be determined whether all cache blocks involved are already dirty at operation 418. If this I/O write request does not involve any clean cache block, completion of this I/O request can be signaled at operation 420, and the process may end.

At operation 418, if it is instead found that not all cache blocks involved are already dirty, for every page of cache metadata involved in this I/O write request at operation 422, it may be determined whether any more pages exist to process at operation 424. If 424 is answered in the negative, the process may end. If, however, operation 424 is answered in the affirmative, it may then be determined whether at least one cache block involved in this I/O in this page has been previously clean at operation 426.

At operation 426, applicable metadata pages for the cache windows involved in the I/O write request can be ascertained and analyzed. For each cache metadata page involved in this I/O write request for which there is at least one clean cache block that is being made dirty, the dirty cache metadata bitmap in the in-memory cache metadata can be updated.

If active queue is determined to be non-empty at operation 428 in this MPTS, then the update request may be queued on the wait queue at operation 430. If, however, the active queue is found to be empty at operation 428, the update request may be instead queued on the active queue at operation 432.

Following operation 432, the dirty cache metadata bitmap can be updated at operation 434 in the in-memory cache metadata corresponding to this update request. Following the updated metadata, a page update in progress (e.g., METADATA_PAGE_UPDATE_IN_PROGRESS) flag can be set at operation 436 in the corresponding MPTS. In addition, a page update in progress flag in this MPTS can also be set at operation 436. Finally, an I/O write can be issued at operation 438 to persistently update this page of cache metadata on the cache device. The process may then end or may return to operation 422 and operation 424, and may determine if there are any more pages to process for every page of cache metadata in the I/O write request.

According to various embodiments, one or more update requests queued on the active queue can be de-queued and signaled for completion. Next, for each cache window in the "delayed metadata flush list" (see also 527 of FIG. 5) in the MPTS for this cache metadata page (that was just updated to cache device), this cache window can be removed from the "delayed metadata flush list." Next, the cache window delayed flush flag (e.g., CW_METADATA_DELAYED_FLUSH) can be cleared for this cache window. Next, the page update in process flag can be cleared in this MPTS.

According to variations, the queue of cache windows (if any) can be moved from a "delayed metadata flush hold list" to the "delayed metadata flush list" in this MPTS. If the wait queue is empty, the process may end. If the wait queue is non-empty, all queued entries can be moved from the wait queue to the active queue.

Next, the page update in progress flag can be set in the MPTS. For each update request entry in active queue, the dirty cache metadata bitmap can be updated in the in-memory cache metadata corresponding to this update request. Then, an I/O write can be issued to persistently update this page of cache metadata on the cache device. If the I/O completion context does not allow the last step, (due to timing considerations related to I/O completion, and also issues related to re-entrance into the I/O driver), then, the same can be executed from (one or more) separate dispatch threads, which may be configured to be dedicated to this purpose. It is contemplated that grouping multiple update requests on a given metadata page may warrant additional or alternative steps and/or details.

Figure 5:
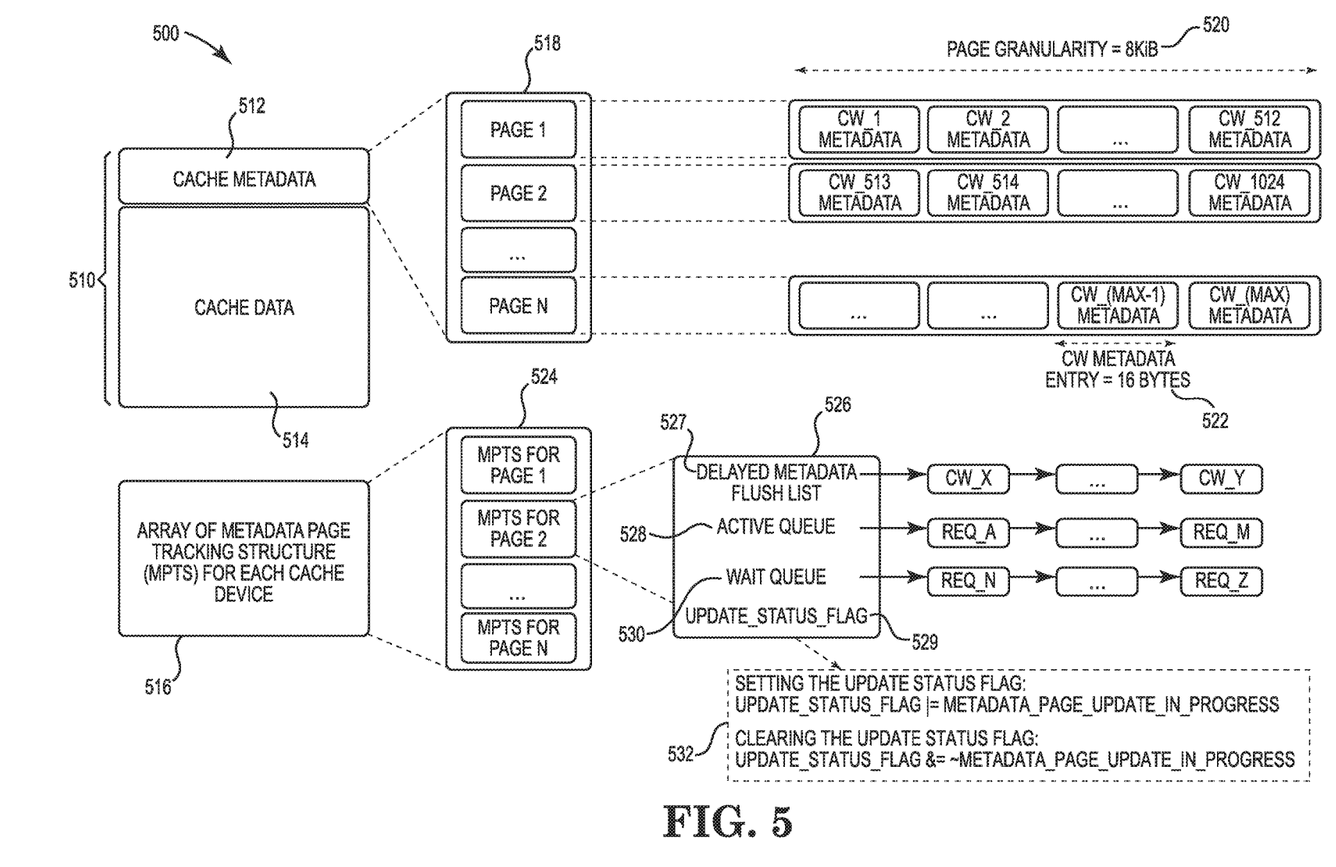
FIG. 5 is a diagram showing metadata page tracking structures for a cache including queues within cache metadata, according to various embodiments.

FIG. 5 is a diagram 500 showing metadata page tracking structures for a cache including queues within cache metadata, according to various embodiments.

Each MPTS may have two fields, including an active queue, and a wait queue. The wait queue may be used to queue all the user I/O write requests that may require an update of this metadata page. The wait queue may also be used where the updates to the metadata page are received when there is an active I/O process currently in progress, in order to persistently update the cache metadata page on the cache device. The active queue represents the queue of user I/O write requests that are currently being serviced by the active I/O issued (or about to be issued) to persistently update this cache metadata page on the cache device.

As described, herein, in order to track and manage a cache window (and other cache windows, as needed), one or MPTS 524 can be created (e.g., instantiated). Embodiments of the MPTS may take the form of an MPTS array 516 for each cache device, as shown, but other configurations are also contemplated.

Additionally, a cache 510 may include cache data 514 and cache metadata 512, as discussed herein. Cache metadata 512 includes metadata for N pages 518, as shown. For each of the N pages, there can exist a page granularity 520 (e.g., 8 KiB). In a case of page granularity of 8 KiB, there may exist 512 cache write metadata entries (such as entry 522), with each entry includes 16 bytes. As shown, page 1 includes cache write metadata entries 1-512, page 2 includes cache write metadata entries 513-1024, and so forth (each including the example 8 KiB of bits), until page n, the maximum entry, is reached last.

Corresponding to the data stored in cache 510, including in particular the cache metadata 512, there may exist an array of MPTSs 524, each including associations per page of cache metadata (where each page is of a page-size described above). Examples of new MPTS 524 configurations proposed herein can be configured to optimize and manage persistent metadata updates issued by user I/O cache write requests. An optimization may be accomplished by grouping together multiple update requests that are otherwise individually and separately issued on the same given metadata page, and in their place, issuing a single update (on behalf of them). The above are covered in detail, herein.

An MPTS may have one or more list field at 526, including a delayed metadata flush list 527, an active queue 528, and wait queue 530, and an update status flag entry 529, including operations and flags for setting and clearing the update status flag at 532. After setting the delayed flush flag on a given cache window, the flagged cache window can be linked to an associated delayed metadata flush list 527 in the corresponding MPTS. In this example, the flush I/O request can be configured to signal completion and return without updating the dirty cache metadata bitmap in the persistent copy of cache metadata (stored on the cache device) for the applicable cache window.

User I/O write requests may update the persistent copy of dirty cache metadata bitmap in the cache metadata 512 (e.g., stored on the cache device) when a clean cache block becomes dirty. Cache metadata 512 (including cache window metadata) marked with a delayed flush flag (e.g., on delayed metadata flush list 527) may then append to the user I/O in order to get the associated to dirty cache metadata bitmap updates persistently written to the cache metadata stored on the cache device. Upon completion of such an update, all cache windows covered by that update and that have the delayed flush flag set, may be cleared of this flag value, according to various embodiments.

Cache window replacement (described in greater detail herein) may require special or different handling and operations. For example, a cache window that has a delayed flush flag set may have to first update the persistent copy of dirty cache metadata bitmap in cache metadata stored on cache device before it can be reallocated.

In order to process a cache window replacement, for each active non-busy cache window that is chosen as a replacement victim (to be reallocated), if a delayed flush flag is not set for this cache window, then this window can be removed from active cache window hash list, and this cache window can be returned. Next, the MPTS covering this cache window can be ascertained and an I/O write can be issued to persistently update this cache metadata page on the cache device To complete a persistent metadata update request routine, in the MPTS for the page-sized cache metadata just updated to cache device, for each cache window in the delayed metadata flush list 527 related to this cache window can be removed from the delayed metadata flush list 527. Next, the delayed flush flag can be cleared for this cache window. In both the scenarios, after the successful completion of the update of the corresponding cache metadata page 518, each of the cache windows on the delayed metadata flush list 527 in the corresponding MPTS 524 can be unlinked, and the delayed flush flag can be cleared, which may indicate that the persistent copy of cache metadata 512 for this cache window is synchronized with the in-memory copy.

According to various embodiments, an MPTS 524, or a global array of MPTSs 516 for all cache devices, for example, could be implemented as a static array, with one MPTS per cache device, as described herein. An example MPTS size for a given cache window, according to one embodiment, may be determined by a cache window (also written as CW) size, which may be 64 KiB and metadata page size may be 8 KiB. If each metadata entry is 16 bytes, then the metadata page 518 would be [8×1024/16]=512 metadata entries for 512 cache windows.

For an example 512 GiB cache device 510, the total number of cache windows (e.g., in cache data 514) on the cache device 510 may be equal to the total size of the cache device 510 (in KiB). The size of a single cache window would then be [512×1024×1024 KiB/64 KiB], or 8 MiB. The total number of metadata pages 518 to be allocated may be defined as the total number of cache windows on this cache device 510 divided by the number of cache windows in 1 metadata page 518, or [8×1024×1024/512=16×1024]=16,384 metadata pages 518. Hence a static array (e.g., 516) of 16,384 MPTSs would need to be allocated per cache device 510, according to the embodiment, above.

With the above, and for an example set of cache windows, each cache window of the corresponding MPTS can be identified by the tuple represented by <CACHE DEVICE_number, CW_number>: where Metadata_Page_Index=CW_number is the number of cache windows per metadata page 518, and this cache window lies in MPTS [CACHE DEVICE_number] [Metadata_Page_Index]. As an example, for values given above, for a cache window with CW_number 600, Metadata_Page_Index=600/512=1 CW 600 exists in MPTS [CACHE DEVICE_number] [1].

Caching operations on cache windows may be marked with a delayed flush flag. When a delayed flush flag is set on an active cache window, it can indicate that the cache window requires a persistent update of the dirty cache metadata bitmap in the cache metadata 512 corresponding to this cache window before it can be reallocated. Since writes are typically primary triggers for caching in WB mode, write I/O requests, in particular, are considered below.

To process I/O completion of a cache metadata page update the cache window can be removed from the delayed metadata flush list 527. The cache metadata page update can be removed from the flush list for each cache window in the delayed metadata flush list 527 in the MPTS for the cache metadata page 518 that was just updated to cache device, according to various embodiments. Next, the delayed flush flag can be cleared for the cache window. Finally, the, page update in progress flag can be cleared in this MPTS. Optionally, for the second variation, the queue of cache windows (if any) can be moved from a delayed metadata flush hold list to a delayed metadata flush list 527 in this MPTS.

Two example scenarios are considered, below. In a first scenario, for a given write I/O request, there is a cache hit on a cache window with a delayed flush flag set. In the second scenario, for a given write I/O request, there is a cache miss. As part of allocation of a cache window, it may be determined that there are no remaining free cache windows. In such case, an active non-busy cache window may be reallocated. Such a reallocated cache window can be denoted a "victim" cache window. The victim cache window then may have the delayed flush flag set.

In the first (cache hit) scenario, the circumstances relating to the cache hit can lead to various sub-cases. In a first sub-case, all the cache blocks in this write I/O request are already marked dirty in the cache metadata bitmap. In a second subcase, some of the cache blocks in this write I/O are not marked dirty in the cache metadata bitmap. In the first sub-case, there may be nothing to be done as related to dirty cache metadata bitmap as the cache blocks involved would previously be marked as dirty, both in the in-memory and persistent copy of the dirty cache metadata bitmap in the cache metadata for this cache window. In the second sub-case, there is at least one clean cache block that is being made dirty for this cache window. In one embodiment of the second sub-case, a persistent update of the dirty cache metadata bitmap for this cache window is warranted, and the detailed steps involved in handling such a situation are discussed, above.

In another embodiment of the second sub-case, a persistent update of the dirty cache metadata bitmap for this cache window could be avoided if an in-memory copy of the persistent dirty cache metadata bitmap on cache device is maintained for each cache window (sometimes called "in-memory commit dirty bitmap"). For the cache blocks in a user write I/O request that are marked clean in the in-memory dirty cache metadata bitmap, if the cache blocks are all still marked as dirty in the in-memory commit dirty bitmap, the dirty bits can directly be set only in the in-memory dirty cache metadata bitmap. These bits may already be set in the persistent copy of dirty cache metadata bitmap on the cache device, which may have been intentionally not cleared as per methods outlined in this disclosure. Every time the in-memory dirty cache metadata bitmap is successfully written in a persistent way to the cache metadata on the cache device, for the corresponding page-sized cache metadata that was just updated, the in-memory dirty cache metadata bitmap may be copied over to the in-memory commit dirty cache metadata bitmap. If the persistent update fails, the in-memory commit dirty cache metadata bitmap may be copied over to the in-memory dirty cache metadata bitmap for the corresponding page-sized cache metadata.

In the second (cache miss) scenario, the cache window with the delayed flush flag set may be reallocated to a different <Volume ID, Volume LBA> range. This may call for an immediate persistent update of the corresponding portion of the dirty cache metadata bitmap before reallocation can be performed. In order to avoid the I/O write request requested for a cache window being put on hold until the corresponding persistent metadata update request is processed to completion, the next victim cache window may be chosen from a cache window replacement list, and processed similarly. This process can be continued until the I/O write request can get a free cache window from the cache window replacement list. Once each of the persistent metadata update requests so issued is processed to completion, the corresponding cache windows can be placed back at the head of the cache window replacement list and can be available for replacement. Examples of these steps are further outlined in greater detail, below.

In an example cache window replacement process, a non-busy cache window can be selected as a replacement victim from a cache window replacement list. Next, the selected cache window can be removed from the cache window replacement list. If a cache window delayed flush flag is not set for the selected cache window then the selected cache window can be removed from an active cache window hash list and the cache window can be returned. Further steps can follow other embodiments described with respect to FIG. 4, herein.

At various times, it can become important to distinguish between update requests issued from I/O write request (which dirty the block a first time) in contrast to update request issued by cache window replacement. This can be due in part to I/O write request actually setting bits in a corresponding dirty bitmap for the cache window involved. This is in contrast to cache window replacement, which would have already cleared the bits in the dirty bitmap for the selected cache window. A cache window being replaced is typically already on the delayed metadata flush list 527 or on a delayed metadata flush hold list.

In one embodiment, an I/O write request that encounters the cache window to be replaced with a cache window delayed flush flag set on it will take it upon itself to first issue I/O write to persistently update the page of cache metadata on the cache device for the cache window being replaced. According to this embodiment, it creates a new I/O request for this purpose, set a new "require metadata flush flag" (e.g., REQ_CW_METADATA_FLUSH) on this new I/O request before issuing the I/O.

Steps involved in handling the example I/O request with the require metadata flush flag can follow the similar steps to those outlined elsewhere herein. However, various changes can also be incorporated for this situation. In the step where it was previously checked if at least one cache block involved in this I/O in this page was previously not dirty, an "OR" condition can be added, where if at least one cache block involved in this I/O in this page was previously non-dirty, "OR" if the require metadata flush flag is set on this I/O request. For example, on a triggering completion of an I/O request, if the require metadata flush flag is set on the I/O request, then the cache window marked for replacement in this request can be put back to the head of the cache window replacement list.

A second modification can involve the step including updating the dirty bitmap in in-memory cache metadata. This step can now be conditional on the require metadata flush flag not being set on this I/O request. For the step including updating the dirty bitmap in in-memory cache metadata during I/O completion, it now can become conditional on the require metadata flush flag not being set on this I/O request, where the step would be changed, if the require metadata flush flag is not set for the I/O request, to update the dirty bitmap in the in-memory cache metadata in this metadata page 518 corresponding to this update request. The rest of the I/O completion handling for metadata updates can then follow the steps outlined elsewhere herein.

Figure 6:
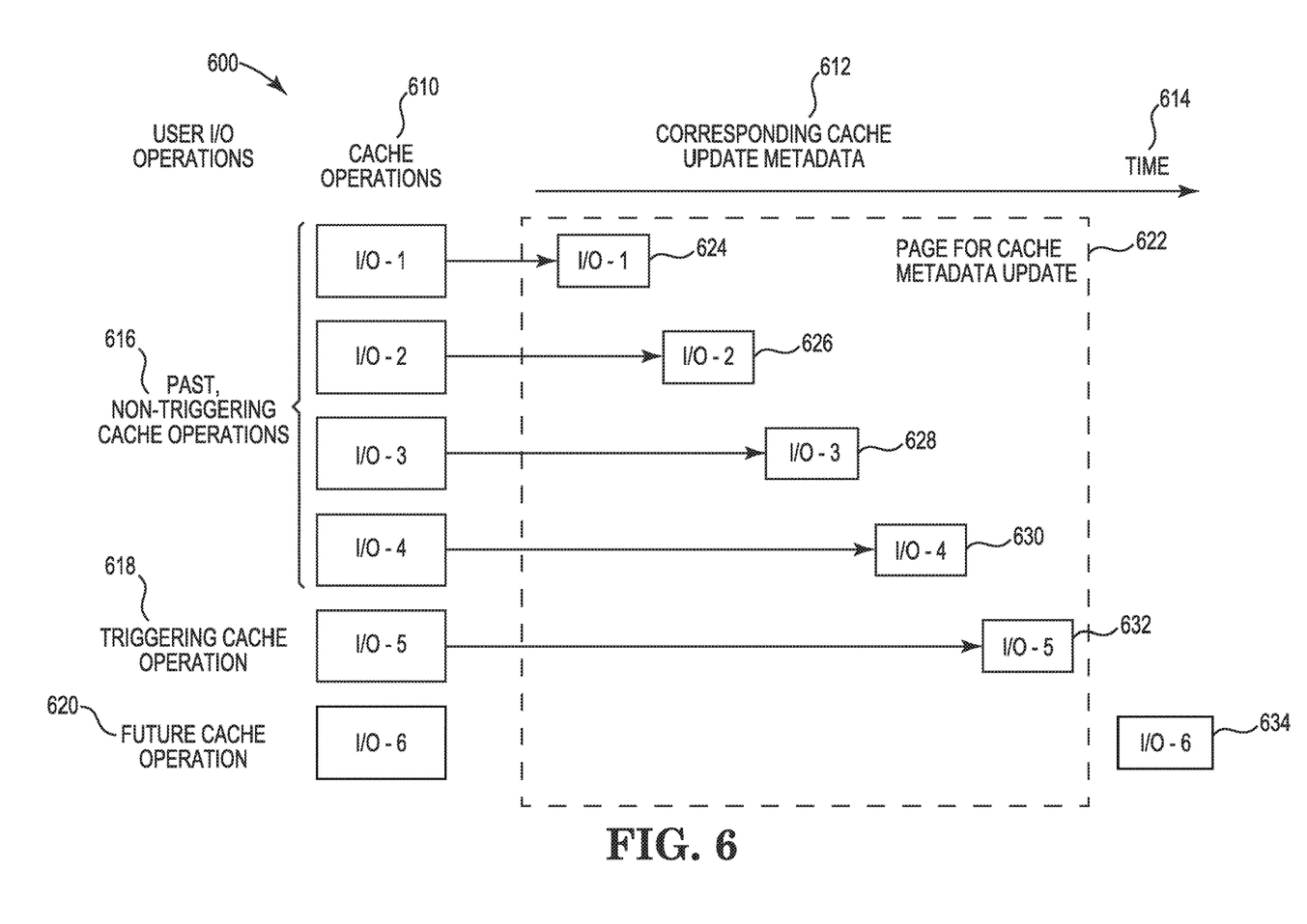
FIG. 6 is an illustration of a triggering user I/O operation, according to various embodiments.

FIG. 6 is an illustration 600 of a triggering user I/O operation 618, according to various embodiments.

A sequence of six example I/O cache operations 610, I/O 1-6 are shown. Cache operations 610 occur over a timeline 614, where cache metadata updates 612 corresponding to cache operations 610 are shown. As shown, Corresponding cache metadata updates include update 624 for I/O-1, 626 for I/O-2, 628 for I/O-3, 630 for I/O-4, 632 for I/O-5, and 634 for I/O-6. Although six cache operations 610 are shown with six corresponding cache metadata updates 612, either more or fewer of either or both are contemplated.

Cache operations 610 can be categorized according to conditions and circumstances. For example, I/O-1 through I/O-4 can be classified as past, non-flushed, non-triggering cache operations 616. As shown, I/O-5 can be classified as a triggering cache flush operation 618 (e.g., in response to a user command, as described herein). And I/O-6, as depicted, as not yet occurred or been processed, and can be classified as a future cache operation 620.

During cache use, various operations take place, as described herein. Some operations can be queued for later updates and cache operations, and some operations can be considered triggering cache operations, such as a triggering cache flush operation 618 (I/O-5 as shown). Using a page for cache metadata flush 622, upon the triggering of a cache flush operation 618, previous and queued non-flushed, non-triggering cache operations 616 can be stored in a page 622, and can be used to update a backing store, for example. As shown, future cache operation 620 has not yet been processed, and therefore would not be stored in page 622 for the cache update flush, as shown.

Figure 7:
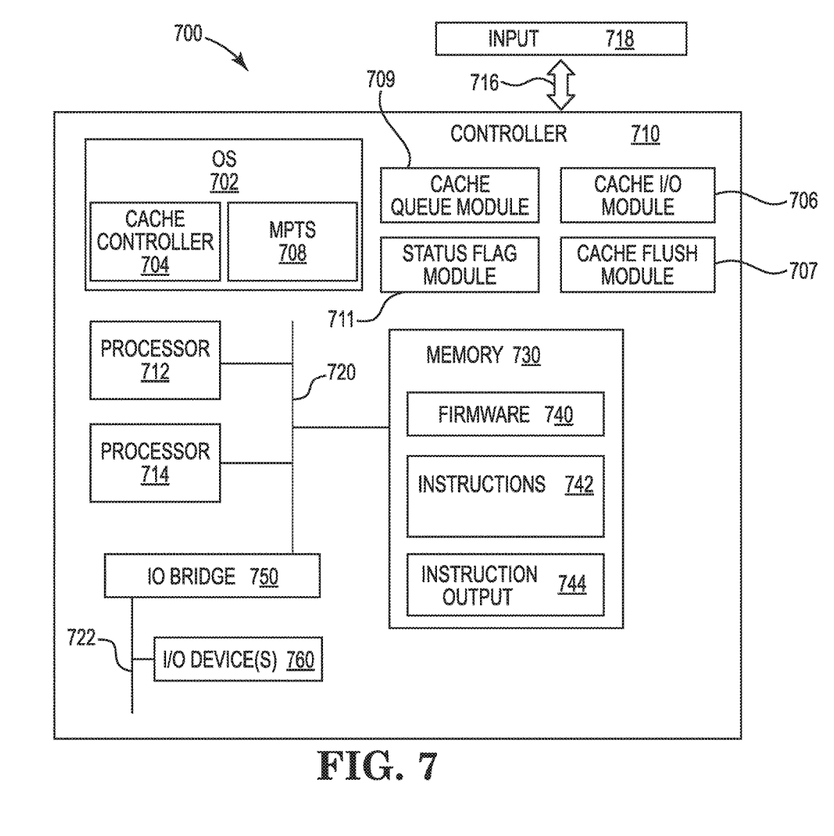
FIG. 7 is a computer system according to embodiments of the present disclosure.

FIG. 7 is a computer system 700 according to embodiments of the present disclosure.

Computer system 700, as shown, is configured with an interface 716 to enable controller 710 to receive a request to manage a cache with respect to user and flush cache operations and one or more backing store, as described with regard to FIGS. 1-8. An input 718 may be received at interface 716. In embodiments, the interface 716 can enable controller 710 to receive, or otherwise access, the input 718 via, for example, a network (e.g., an intranet, or a public network such as the Internet), or a storage medium, such as a disk drive internal or connected to controller 710. The interface can be configured for human or user input or other input devices, such as described later in regard to components of controller 710. It would be apparent to one of ordinary skill in the art that the interface can be any of a variety of interface types or mechanisms suitable for a computer, or a program operating in a computer, to receive or otherwise access or receive a source input or file.

Processors 712, 714 included in controller 710 are connected by a memory interface 720 to memory device or module 730. In embodiments, the memory 730 can be a cache memory, a main memory, a flash memory, or a combination of these or other varieties of electronic devices capable of storing information and, optionally, making the information, or locations storing the information within the memory 730, accessible to a processor. Memory 730 can be formed of a single electronic (or, in some embodiments, other technologies such as optical) module or can be formed of a plurality of memory devices. Memory 730, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 700 can include a plurality of memory devices. A memory interface, such as 720, between a one or more processors and one or more memory devices can be, for example, a memory bus common to one or more processors and one or more memory devices. In some embodiments, a memory interface, such as 720, between a processor (e.g., 712, 714) and a memory 730 can be point to point connection between the processor and the memory, and each processor in the computer 700 can have a point-to-point connection to each of one or more of the memory devices. In other embodiments, a processor (for example, 712) can be connected to a memory (e.g., memory 730) by means of a connection (not shown) to another processor (e.g., 714) connected to the memory (e.g., 720 from processor 714 to memory 730).

Computer 700 can include an input/output (I/O) bridge 750, which can be connected to a memory interface 720, or to processors 712, 714. An I/O bridge 750 can interface the processors 712, 714 and/or memory devices 730 of the computer 700 (or, other I/O devices) to I/O devices 760 connected to the bridge 720. For example, controller 710 includes I/O bridge 750 interfacing memory interface 720 to I/O devices, such as I/O device 760. In some embodiments, an I/O bridge can connect directly to a processor or a memory, or can be a component included in a processor or a memory. An I/O bridge 750 can be, for example, a peripheral component interconnect express (PCI-Express) or other I/O bus bridge, or can be an I/O adapter.

An I/O bridge 750 can connect to I/O devices 760 by means of an I/O interface, or I/O bus, such as I/O bus 722 of controller 710. For example, I/O bus 722 can be a PCI-Express or other I/O bus. I/O devices 760 can be any of a variety of peripheral I/O devices or I/O adapters connecting to peripheral I/O devices. For example, I/O device 760 can be a graphics card, keyboard or other input device, a hard disk drive (HDD), solid-state drive (SSD) or other storage device, a network interface card (NIC), etc. I/O devices 760 can include an I/O adapter, such as a PCI-Express adapter, that connects components (e.g., processors or memory devices) of the computer 700 to various I/O devices 760 (e.g., disk drives, Ethernet networks, video displays, keyboards, mice, styli, touchscreens, etc.).

Computer 700 can include instructions executable by one or more of the processors 712, 714 (or, processing elements, such as threads of a processor). The instructions can be a component of one or more programs. The programs, or the instructions, can be stored in, and/or utilize, one or more memory devices of computer 700. As illustrated in the example of FIG. 7, controller 710 includes a plurality of programs or modules (e.g., MPTS modules or the like), such as cache queue module 709, status flag module 711, cache I/O module 706, and cache flush module 707. A program can be, for example, an application program, an operating system (OS) or a function of an OS, or a utility or built-in function of the computer 700. A program can be a hypervisor, and the hypervisor can, for example, manage sharing resources of the computer 700 (e.g., a processor or regions of a memory, or access to an I/O device) among a plurality of programs or OSes.

Programs can be "stand-alone" programs that execute on processors and use memory within the computer 700 directly, without requiring another program to control their execution or their use of resources of the computer 700. For example, controller 710 includes (optionally) stand-alone programs in cache queue module 709, status flag module 711, cache I/O module 706, and cache flush module 707. A stand-alone program can perform particular functions within the computer 700, such as controlling, or interfacing (e.g., access by other programs) an I/O interface or I/O device. A stand-alone program can, for example, manage the operation, or access to, a memory (e.g., memory 730). A basic I/O subsystem (BIOS), or a computer boot program (e.g., a program that can load and initiate execution of other programs) can be a standalone program.

Controller 710 within computer 700 can include one or more OS 702, and an OS 702 can control the execution of other programs such as, for example, to start or stop a program, or to manage resources of the computer 700 used by a program. For example, controller 710 includes OS 702, which can include, or manage execution of, one or more programs, such as OS 702 including (or, managing) program 704. In some embodiments, an OS 702 can function as a hypervisor.

A program can be embodied as firmware (e.g., BIOS in a desktop computer, or a hypervisor) and the firmware can execute on one or more processors and, optionally, can use memory, included in the computer 700. Firmware can be stored in a memory (e.g., a flash memory) of the computer 700. For example, controller 710 includes firmware 740 stored in memory 730. In other embodiments, firmware can be embodied as instructions (e.g., comprising a computer program product) on a storage medium (e.g., a CD-ROM, DVD-ROM, a flash memory, or a disk drive), and the computer 700 can access the instructions from the storage medium.

In embodiments of the present disclosure, computer 700 can include instructions for cache management and invalidation using flags to queue and activate cache flush operations based on triggering cache flush operations. Controller 710 includes, for example, cache queue module 709 and status flag module 711, which can operate to control data transmission between one or more caches and one or more backing stores, e.g., using WT or WB policies, in conjunction with cache I/O module 706 and cache flush module 707. The computer 700 can store status flags related to cache blocks and cache operations at module 711 and/or the cache operation queue at module 709 in a memory 730 of the computer 700, such as controller 710, where the cache I/O module can utilize the cache flush module 707 to selectably flush various cache blocks based on data and operation of cache queue module 709 and/or status flag module 711.

The example computer system 700 and controller 710 are not intended to limiting to embodiments. In embodiments, computer system 700 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of ordinary skill in the art to include a variety of computing devices interconnected in a variety of manners in a computer system embodying aspects and features of the disclosure.

In embodiments, controller 710 can be, for example, a computing device having a processor (e.g., 712) capable of executing computing instructions and, optionally, a memory 730 in communication with the processor. For example, controller 710 can be a desktop or laptop computer; a tablet computer, mobile computing device, personal digital assistant (PDA), or cellular phone; or, a server computer, a high-performance computer (HPC), or a super computer. Controller 710 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

The extent of performance improvements of the described embodiments, when compared to existing methods, may, for example, be proportional to the number of metadata pages, the number of individual metadata entries updated in each metadata update page at any point in time, and/or the I/O queue depth supported by the particular cache device(s). According to this disclosure, a metadata update page is updated in parallel with the updates of other metadata pages on the cache device. Hence, the amount of parallelism may be determined by the queue depth supported by the device. Furthermore, given that multiple cache devices may be configured, the performance gains would potentially be multiplied by the number of cache devices configured.

It is understood that numerous variations of cache management could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at cache management using activation counts and sub-state, that includes features of different illustrated embodiments. It is further understood that certain embodiments discussed above include using the activation counts of cache blocks to improve cache performance and clean-up.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

What is claimed is:

1. A method of adjusting asynchronous cache operations on a cache device, comprising:
   accessing the cache device having a plurality of cache windows, each cache window having a plurality of cache blocks, and each cache block having corresponding metadata indicating a status of the cache block;
   receiving, at a first cache block of the plurality of cache blocks, a first input/output operation;
   updating a first metadata of the first cache block, in response to the receiving the first input/output operation, the first metadata being marked as dirty;
   receiving, at a second cache block of the plurality of cache blocks, a second input/output operation;
   updating a second metadata of the second cache block, in response to the receiving the second input/output operation, the second metadata being marked as dirty;
   grouping, in a page, the first and second input/output operations;
   updating, in a single operation according to the page, the first and second cache blocks according to the first and second input/output operations; and
   marking the first and second metadata as non-dirty.

2. The method of claim 1, wherein the second input/output operation is received from a user.

3. The method of claim 1, wherein the first input/output operation is a write operation.

4. The method of claim 1, wherein the first input/output operation is a flush operation.

5. The method of claim 1, wherein the first metadata is persistent metadata.

6. The method of claim 1, wherein the grouping in a page further includes the first and second metadata updates.

7. The method of claim 1, wherein the grouping is in response to a flush threshold being reached, wherein the flush threshold includes a predicted cache hit ratio for the cache device.

8. A cache device, comprising:
   a plurality of cache windows, each cache window having a plurality of cache blocks, and each cache block having corresponding metadata indicating a status of the cache block; and
   a controller configured to perform the steps, including:
      receiving, at a first cache block of the plurality of cache blocks, a first input/output operation;
      updating a first metadata of the first cache block, in response to the receiving the first input/output operation, the first metadata being marked as dirty;
      receiving, at a second cache block of the plurality of cache blocks, a second input/output operation;
      updating a second metadata of the second cache block, in response to the receiving the second input/output operation, the second metadata being marked as dirty;
      grouping, in a page, the first and second input/output operations;
      updating, in a single operation according to the page, the first and second cache blocks according to the first and second input/output operations; and
      marking the first and second metadata as non-dirty.

9. The cache device of claim 8, wherein the second input/output operation is received from a user.

10. The cache device of claim 8, wherein the first input/output operation is a write operation.

11. The cache device of claim 8, wherein the first input/output operation is a flush operation.

12. The cache device of claim 8, wherein the first metadata is persistent metadata.

13. The cache device of claim 8, wherein the grouping in a page further includes the first and second metadata updates.

14. The cache device of claim 8, wherein the grouping by the controller is in response to a flush threshold being reached, wherein the flush threshold includes a predicted cache hit ratio for the cache device.

15. A method of adjusting asynchronous cache operations on a cache device, comprising:
   accessing the cache device having a plurality of cache windows, each cache window having a plurality of cache blocks, and each cache block having corresponding metadata indicating a status of the cache block;
   receiving, at a first cache block of the plurality of cache blocks, a first input/output operation;
   updating a first metadata of the first cache block, in response to the receiving the first input/output operation, the first metadata being marked as presently existing only in the cache device;
   receiving, at a second cache block of the plurality of cache blocks, a second input/output operation;
   updating a second metadata of the second cache block, in response to the receiving the second input/output operation, the second metadata being marked as presently existing only in the cache device;
   grouping, in a page, the first and second input/output operations;
   updating, in a single operation according to the page, the first and second cache blocks according to the first and second input/output operations; and
   removing the marking of presently existing only in the cache device from the first and second metadata.

16. The method of claim 15, wherein the second input/output operation is received from a user.

17. The method of claim 15, wherein the first input/output operation is a write operation.

18. The method of claim 15, wherein the first input/output operation is a flush operation.

19. The method of claim 15, wherein the grouping in a page further includes the first and second metadata updates.

20. The method of claim 15, wherein the grouping is in response to a flush threshold being reached, wherein the flush threshold includes a predicted cache hit ratio for the cache device.

* * * * *